United States Patent
Andersson et al.

(10) Patent No.: US 7,779,952 B2
(45) Date of Patent: Aug. 24, 2010

(54) DRIVE SYSTEM AND AN AXLE FOR A VEHICLE DRIVELINE, AND A VEHICLE COMPRISING THE DRIVELINE

(75) Inventors: Thomas Andersson, Eskilstuna (SE); Jonny Strandberg, Eskilstuna (SE); Christian Wargh, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 339 days.

(21) Appl. No.: 11/719,759

(22) PCT Filed: Dec. 21, 2004

(86) PCT No.: PCT/SE2004/001998

§ 371 (c)(1),
(2), (4) Date: May 21, 2007

(87) PCT Pub. No.: WO2006/068560

PCT Pub. Date: Jun. 29, 2006

(65) Prior Publication Data

US 2008/0087485 A1  Apr. 17, 2008

(51) Int. Cl.
*B60K 17/354* (2006.01)
(52) U.S. Cl. ............... 180/247; 180/24.08; 180/233; 180/22
(58) Field of Classification Search .......... 180/247, 180/233, 22, 24.08, 24.11
See application file for complete search history.

(56) References Cited

U.S. PATENT DOCUMENTS

| 4,883,142 A | * | 11/1989 | Rispeter | 180/245 |
| 6,817,434 B1 | | 11/2004 | Sweet | |
| 7,111,702 B2 | * | 9/2006 | Perlick et al. | 180/233 |
| 2001/0050188 A1 | * | 12/2001 | Ima | 180/22 |
| 2004/0104056 A1 | * | 6/2004 | Perlick et al. | 180/6.2 |

OTHER PUBLICATIONS

International Search Report for corresponding International Application PCT/SE2004/001998.
International Preliminary Report on Patentability for corresponding International Application PCT/SE2004/001998.

* cited by examiner

*Primary Examiner*—Lesley Morris
*Assistant Examiner*—Jacob Knutson
(74) *Attorney, Agent, or Firm*—WRB-IP LLP

(57) ABSTRACT

The invention relates to a drive system for a vehicle driveline comprising a pair of interconnected first transverse drive shafts (31a, 31b) extending in opposite directions, each of which supports a ground engaging member, and a first arrangement (101) allowing said pair of first transverse drive shafts to rotate at different speeds. Said arrangement (101) comprises a pair of individually selectively engagable clutches (37a, 37b), one clutch for each transverse drive shaft, and each of said clutches (37a, 37b) is configured for engaging and disengaging, respectively, the associated transverse drive shaft (31a, 31b) to a driving connection with a source of motive power.

16 Claims, 6 Drawing Sheets

DRIVE SYSTEM AND AN AXLE FOR A VEHICLE DRIVELINE, AND A VEHICLE COMPRISING THE DRIVELINE

BACKGROUND AND SUMMARY

The present invention relates to a drive system for a vehicle driveline comprising a pair of interconnected first transverse drive shafts extending in opposite directions, each of which supports a ground engaging member, and an arrangement allowing said pair of first transverse drive shafts to rotate at different speeds. The invention also relates to an axle comprising said pair of transverse drive shafts for a vehicle driveline and a vehicle comprising the driveline.

The invention will below be described for a frame-steered work vehicle in the form of an articulated hauler. This should however be regarded as a non-limiting example. The invention may also be applied in other frame-steered work vehicles, like a wheel loader, backhoe loader, tractor and other types of work vehicles, like an excavator or a skid steer vehicle. The term "ground engaging member" is used for drive wheels or caterpillar tracks. The invention may further be applied in a passenger car, truck or bus.

In addition to delivering power from a source of motive power to a number of drive wheels, the drive system must permit the respectively driven wheels to rotate at different speeds. In a turn, for example, the outside wheels must rotate faster than the inside wheels, and the front wheels must rotate faster than the rear wheels. Typically, the pair of first transverse drive shafts rotatively driving a right and left drive wheel, respectively are interconnected by a connection arrangement in the form of a differential mechanism which permits the opposite drive wheels to rotate at different speeds while delivering an approximately equal amount of drive torque to each. A longitudinal drive shaft rotatively connects a vehicle gear box with the differential mechanism. However, this characteristic of delivering approximately equal amounts of torque to the drive wheels independently of their relative rotational speed significantly limits the total amount of torque which can be delivered to the drive wheels when one of the drive wheels loses traction.

One way of overcoming this problem is to use a clutch mechanism that resists any differential rotation between the drive wheels. In other words, unequal torque distributions between drive wheels are supported by sacrificing some of the differential capacity to support unequal rotational speeds between the drive wheels. Thus, the clutch locks the differential mechanism. Such a clutch is normally, at least for work vehicles, formed by an on-off claw clutch.

In a drive system for all wheel drive, power is delivered to different combinations of drive wheels. In addition to delivering power to both a front and at least one rear drive axle, all wheel drives must also permit the two axles to rotate at different speeds. Accordingly, the longitudinal drive shafts to the front and rear axle are often interconnected by a differential mechanism which permits the front and rear drive axles to rotate at different speeds while delivering approximately equal amounts of torque to them. It is also known to use a clutch mechanism for locking such longitudinal differential.

A frame-steered work vehicle, such as an articulated hauler, comprises a forward vehicle section comprising a forward frame and a front wheel axle supported by the frame and a rear vehicle section comprising a rear frame and at least one rear wheel axle supported by the frame. The forward frame is connected to the rear frame by means of an articulation joint allowing the forward vehicle section and the rear vehicle section to pivot relative to one another about a vertical axis. A pair of hydraulic cylinders is arranged one on each side of the articulation joint and controlled by the driver via a steering wheel and/or a joy stick for steering the vehicle.

In an articulated hauler the forward vehicle section comprises an engine for propelling the vehicle and a cab. The rear vehicle section comprises a tiltable load-carrying platform. Further, the rear vehicle section has two rear wheel axles, a forward bogie axle and a rear bogie axle. Articulated haulers are used for transporting heavy loads, such as earth, gravel and stones both in areas where there are no roads, for example in connection with road and tunnel building, in sand pits, mines and similar environments, i.e. on uneven ground, and on the road. The articulated hauler is commonly designed for switching between operations using various driving wheel combinations, all six wheels on the three axles being selectively operable as driving wheels, depending on the prevailing operating conditions.

It is desirable to achieve a drive system and an axle for a vehicle driveline, which improves the control of the driveline with regard to delivery of drive torque to the ground engaging members.

According to an aspect of the present invention, the drive system comprises a pair of individually selectively engagable clutches, one clutch for each transverse drive shaft, and each of said clutches is configured for engaging and disengaging, respectively, the associated transverse drive shaft to a driving connection with a source of motive power. In such a drive system, there is no need for a differential mechanism. Instead, when one of the clutches is engaged, the transverse drive shafts are free from being in a rotational connection to each other. Thus, each ground engaging member may be controlled individually.

Preferably, said clutch is gradually engagable so that it permits, in an active state, different relative rotational speeds between an input member and an output member of the clutch. Thus, each clutch is configured to permit different degrees of slip. This creates conditions for a dynamic control of the drive line.

Further, the drive system advantageously comprises a main gear box, a first drive shaft configured to extend in a vehicle longitudinal direction and which rotatively connects the main gear box and said first pair of transverse drive shafts. Thanks to said pair of individually selectively engagable clutches, there is no need for a clutch in the main gear box.

According to a preferred embodiment, said arrangement for allowing different shaft speeds comprises a transmission comprising a pinion wheel adapted to be rotationally fixed to an associated longitudinal drive shaft and a crown wheel intermeshed with the pinion wheel and rotationally fixed to an input member of said clutch. Thus, each ground engaging member is free from being in a rotational connection to the crown wheel when the associated clutch is disengaged.

According to a further preferred embodiment, the drive system comprises a control unit operationally connected to each clutch for controlling engagement thereof. Further, the drive system comprises a plurality of rotational speed sensors for sensing the difference in rotational speeds across each clutch, and that said sensors are operatively connected to said control unit. Said control unit comprises a memory and a processor with software for controlling the engagement of the clutches. Thus, the sensed rotational speeds of the ground engaging members are received by the control unit, which determines which clutch(es) that should be engaged and to what extent and thereafter actuates the clutch(es) accordingly. Such a drive system would give an intelligent control with maximum freedom with regard to drive torques and restraint torque in the driveline.

Further, for an optimum control preferably all wheel axles of the vehicle driveline are provided with such a pair of individually selectively engagable clutches. In an articulated hauler, a transfer gear box is operationally connected between the main gear box and the longitudinal drive shafts. The purpose of the transfer gearbox is to allow shifting between a low-gear register (low) and a high-gear register (high) and also to distribute the force between the front axle and the rear axles. Thanks to said pair of individually selectively engagable clutches, there is no need for either a clutch or a differential mechanism in the transfer gear box.

According to a preferred embodiment, the drive system comprises a longitudinal clutch arranged for engaging and disengaging, respectively, the second (and third) wheel axle from a driving connection with the main gear box. By disconnecting said longitudinal clutch, only the first (front) wheel axle is in driving connection with the engine. Thus, the wheels of the second (and third) axle would rotate, however not the central transmission in the axle. This would give an energy-efficient driving, especially advantageous for transporting material longer stretches.

A further purpose of the invention is to achieve a method for controlling the power delivered to a plurality of ground engaging members of a vehicle driveline, which improves the control of the driveline with regard to delivery of drive torque to the ground engaging members.

This purpose is achieved with a method according to the following claim 27. Further advantageous embodiments and further advantages of the invention emerge from the detailed description below and the claims.

BRIEF DESCRIPTION OF THE DRAWINGS

The invention will be explained below, with reference to the embodiments shown on the appended drawings, wherein.

DETAILED DESCRIPTION

Figure 1:
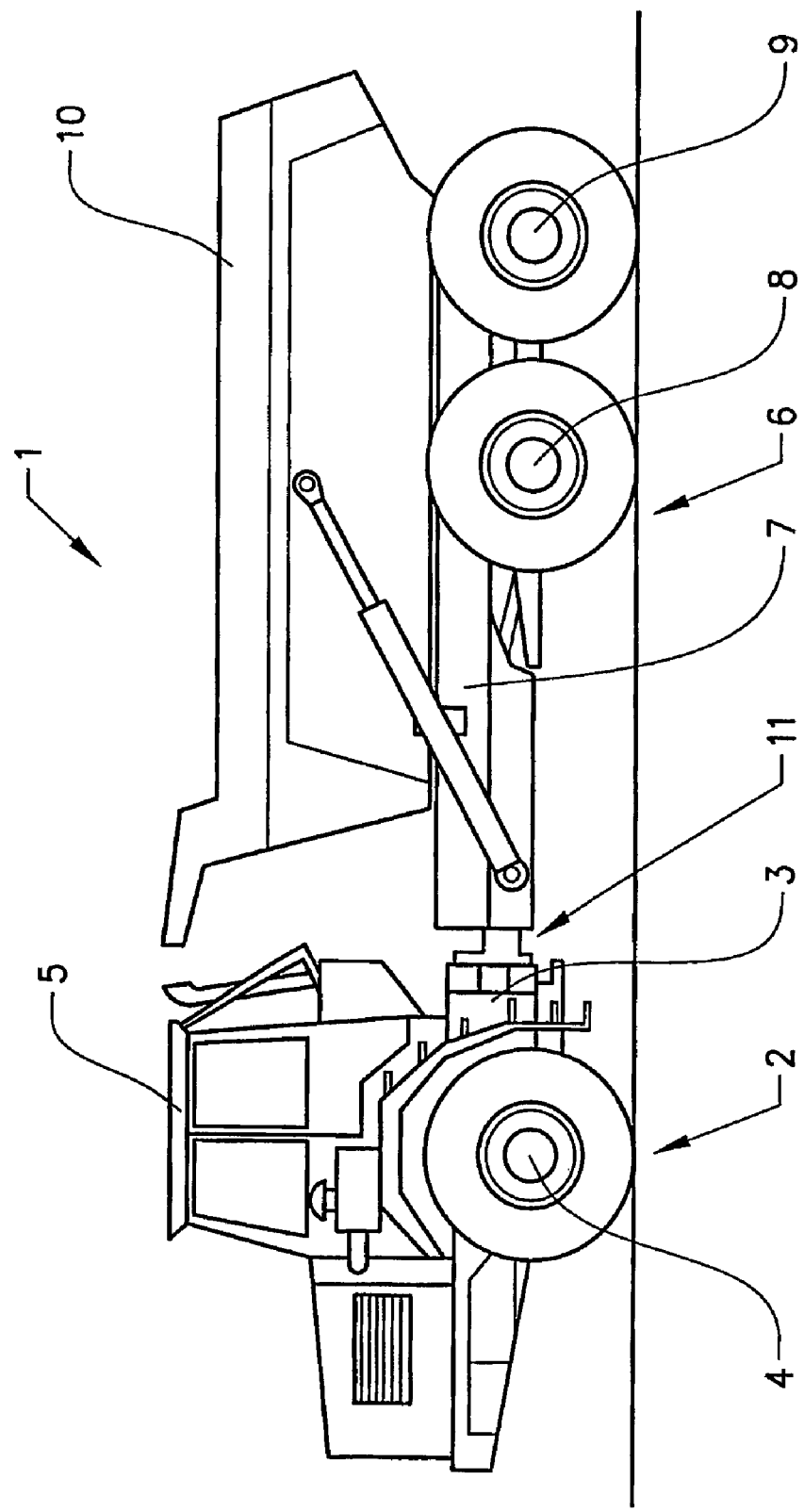
FIG. 1 illustrates an articulated hauler in a side view.

FIG. 1 illustrates a frame-steered work vehicle in the form of an articulated hauler 1. The articulated hauler 1 comprises a forward vehicle section 2 comprising a forward frame 3, a front wheel axle 4 an engine (not shown) for propelling the vehicle and a cab 5. The articulated hauler 1 also comprises a rear vehicle section 6 comprising a rear frame 7, a forward bogie axle 8, a rear bogie axle 9 and a tiltable load-carrying platform 10.

The forward frame 3 is connected to the rear frame 7 by means of an articulation joint 11 allowing the forward vehicle section 2 and the rear vehicle section 6 to pivot relative to one another about a vertical axis. A pair of hydraulic cylinders (not shown) is arranged one on each side of the articulation joint 11 and controlled by an operator via a steering wheel and/or a joy stick (not shown) for steering of the vehicle. The articulation joint 11 is further configured for allowing the forward vehicle section 2 and the rear vehicle section 6 to pivot relative to one another about an imaginary longitudinal axis, i.e. an axis extending in the longitudinal direction of the vehicle 1. In this way, the forward vehicle section 2 and the rear vehicle section 6 are allowed to move substantially independent from each other.

Figure 2:
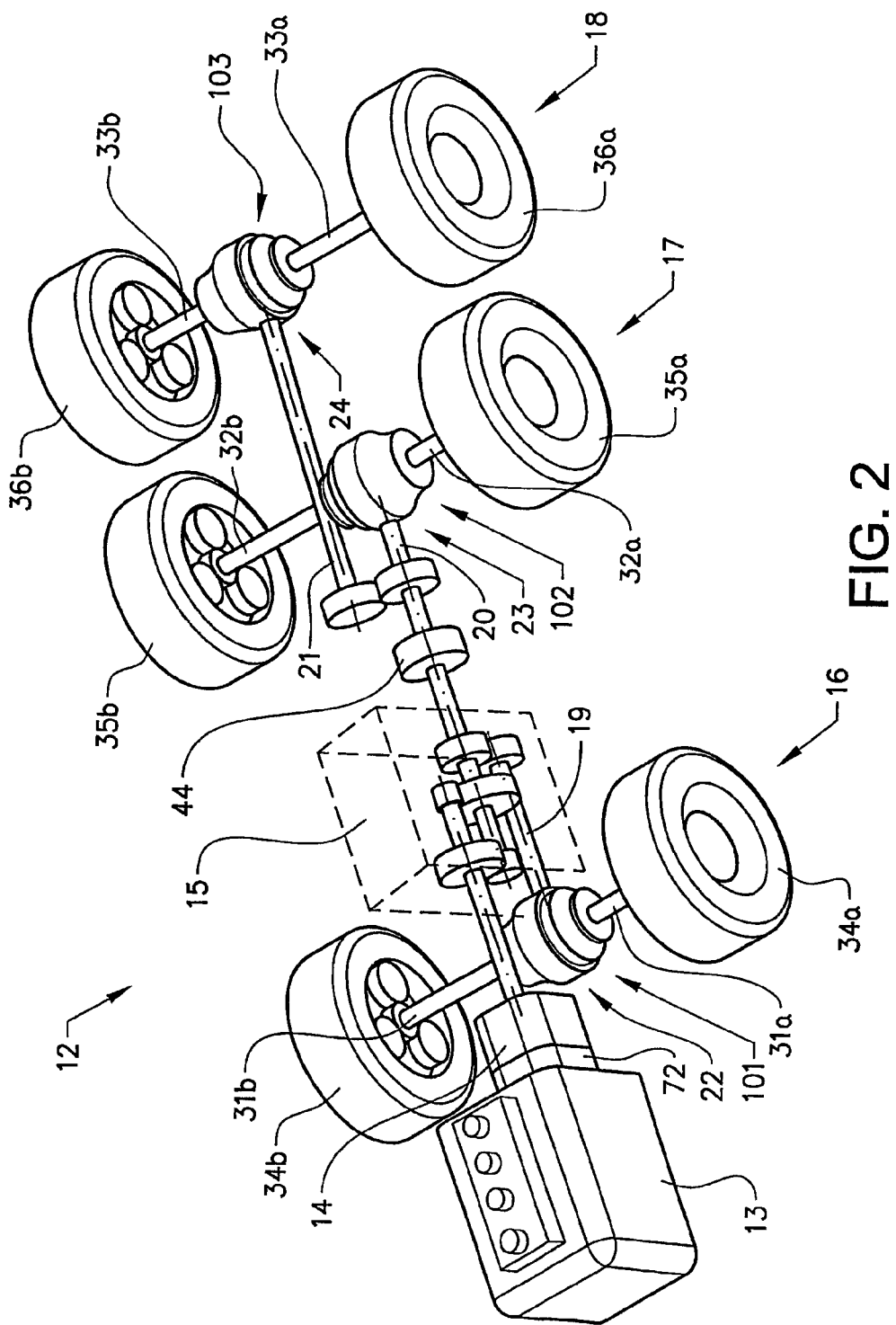
FIG. 2 illustrates an embodiment of a driveline of the articulated hauler in FIG. 1 in a schematic view.

FIG. 2 illustrates a driveline 12 for the articulated hauler 1. The driveline 12 comprises a source of motive power 13 in the form of a diesel engine and a main gear box in the form of an automatic transmission 14 rotatively connected to an output shaft of the engine 13. The main gear box 14 has for example six forward gear ratios and two reverse gear ratios. The driveline 12 further comprises a transfer gear box 15 rotatively connected to an output shaft of the main gear box 14. The transfer gear box 15 is arranged to distribute the power from the main gear box between a front axle 16 and two rear axles 17,18. The transfer gear box preferably has a low-gear register and a high-gear register.

A first, second and third drive shaft 19,20,21 extending in the vehicle longitudinal direction are rotatively connected to the transfer gear box 15 and to a connection arrangement in the form of a central transmission 22,23,24 in each of the front axle 16 and the two rear axles 17,18.

Figure 3:
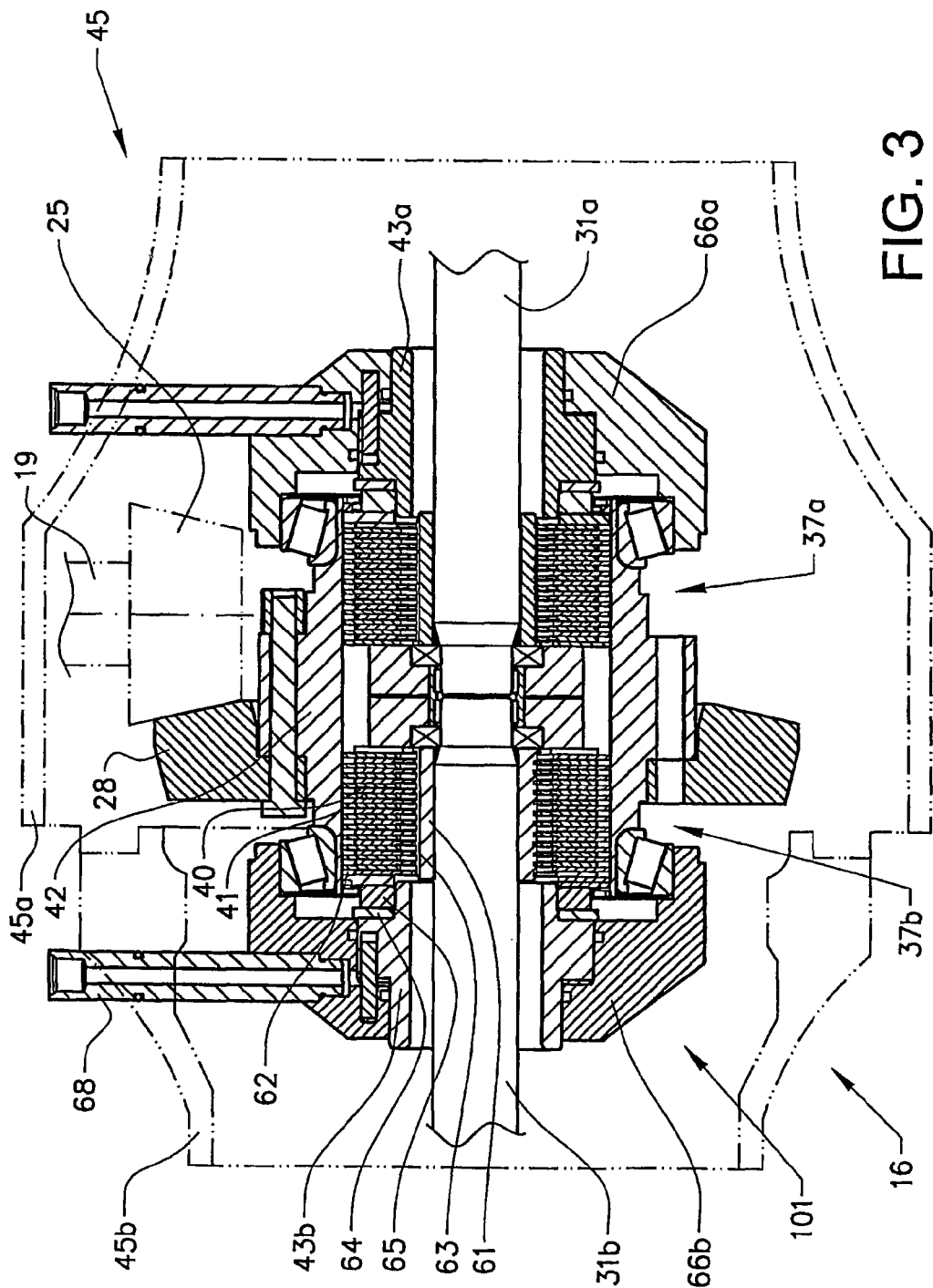
FIG. 3 illustrates an embodiment of an axle for the articulated hauler driveline in FIG. 2.

Each of said central axle transmissions 22,23,24 comprises a pinion wheel 25, see FIG. 3, rotationally fixed to the associated longitudinal drive shaft 19. Each of said central axle transmissions 22,23,24 further comprises a crown wheel 28 intermeshed with the pinion wheel 25 and rotationally fixed to a pair of transverse drive shafts 31a, 31b,32a, 32b,33a,33b extending in opposite directions from the crown wheel 28. Each of said transverse drive shafts 31a,31b,32a,32b, 33a, 33b is rotatively connected to a ground engaging member 34a, 34b, 35a, 35b,36a,36b in the form of a wheel.

The drive system comprises a first, second and third arrangement 101,102,103 allowing each of said pair of first transverse drive shafts 31a,31b,32a,32b,33a,33b to rotate at different speeds. Each of said arrangements 101,102,103 comprises a pair of individually selectively engagable clutches 37a,37b, one clutch for each transverse drive shaft, see also FIG. 3. Said clutches are configured for engaging and disengaging, respectively, the associated ground engaging member 34a, 34b, 35a,35b,36a,36b to a driving connection with the central axle transmission 22,23,24.

Each of said individually selectively engagable clutches 37a,37b is gradually engagable so that it permits, in an active state, different relative rotational speeds between an input member and an output member (output shaft) of the clutch. Further, each of said individually selectively engagable clutches 37a,37b is a hydraulically activated friction disc clutch. For ease of presentation, one of the friction disc clutches in the three wheel axles 16,17,18 will be described in detail below in connection with FIG. 3. More specifically, the clutch arrangement of the first axle 16 is described. It should be understood that the further clutches have a corresponding configuration.

In FIG. 3, the first arrangement 101 for allowing the drive shafts 31a,31b to rotate at different speeds is shown. The crown wheel 28 is rotationally fixed to a clutch housing 42. The clutch housing 42 comprises means 62 for rotationally fixing a first set of friction discs 40. Said fixing means 62 is formed by internal splines in the clutch housing 42. The first set of friction discs 40 are mutually axially displaceable on said splines.

A tubular member 61 is rotationally fixed via splines on the drive shaft 31b. Said tubular member 61 has means 63 for rotationally fixing a second set of friction discs 41. Said fixing means 63 is here formed by splines. The second set of friction discs 41 are also mutually axially displaceably arranged.

Thus, the friction disc clutch 37a comprises two sets of friction discs 40,41. Every second friction disc in the axial direction of the transverse drive shaft belongs to the first set of friction discs 40 and every second to the second set of friction discs 41. The friction discs may be made of, for example, metal, plastic or carbon fibre. It is also possible to use other materials.

Further, the clutch 37b comprises an actuator 43b in the form of a hydraulic piston for selectively engaging and disengaging, respectively, the clutch. The hydraulic piston is thus arranged to compress the friction disc pack for engaging the clutch. The hydraulic piston 43b is configured to compress the friction disc pack by means of hydraulic fluid under pressure from a line 68 acting on the hydraulic piston. A washer 64 of a harder material than the piston and an axial bearing 65 are arranged axially between the piston 43b and the sets of friction discs 40,41.

Further, said clutches may have an over-heat protection. This may be achieved by arranging a sensor for sensing the pressure in the clutch, which sensor is arranged to produce a signal for disengagement of the associated clutch when there is a risk for over-heating. For the over-heat protection function, the detected difference in rotational speeds across the clutch in question is also used as an input. As an alternative to using the signal from the pressure sensor in the clutch, the signal to the valve, which controls the pressure delivered to the clutch, may be used.

Further, an axle casing 45 is indicated in FIG. 3. The casing surrounds the transmission 22, the clutches 37a,37b and the transverse drive shafts 31a,31b. The casing 45 is in the shown embodiment formed by two halves 45a,45b. A right and a left clutch housing 66a, 66b are fixed, for example by a bolt connection, one in each axle half 45a, 45b. The axle halves 45a,45b are joined together, for example by a bolt connection.

As an alternative design of the axle casing, each clutch housing is casted in one of said casing halves.

As a further alternative design of the axle casing, the casing comprises at least partially both transverse drive shafts and has an opening for receiving the transmission arrangement comprising the two clutches allowing the transverse drive shafts to rotate at different speeds.

A longitudinal clutch 44 is arranged on the longitudinal drive shaft 20, see FIG. 2, with a corresponding design to the design of the axle disc clutch described above. By disengaging the longitudinal clutch 44, the rear wheels 35a, 35b,36a, 36b are disconnected from being driven by the vehicle engine 13. Thus, the vehicle will be front-wheel driven. By, in addition, disengaging the two pair of clutches in the rear axles, the central axle transmissions 23,24 in the rear axles will not rotate. The transmission components will then not rotate. In this way, transport longer stretches may be accomplished very energy-efficient with low power requirement and low losses, especially no splash losses thanks to that the disconnected central transmissions are not rotating in hydraulic fluid.

Figure 4:
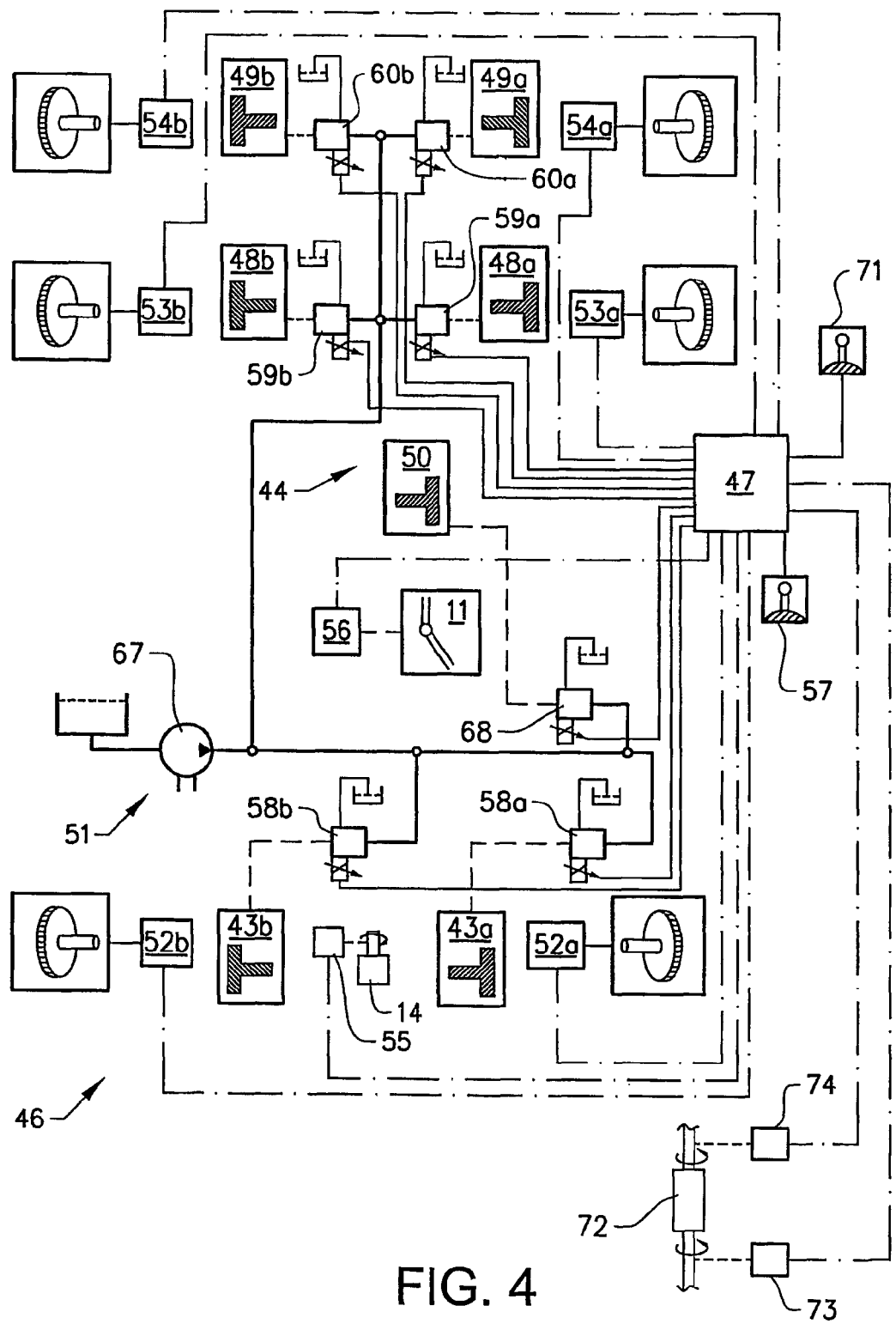
FIG. 4 illustrates an embodiment of a drive system for the articulated hauler driveline in FIG. 2.

In FIG. 4, a drive system 46 is schematically shown. The drive system 46 comprises a control unit 47 operationally connected to the actuator (hydraulic piston) 43a,43b, 48a, 48b,49a,49b, 50 of each clutch for controlling engagement thereof. More specifically, the drive system 46 comprises a hydraulic system 51 for controlling the hydraulic pistons. The control unit 47 is connected to a set of electronically actuatable hydraulic valves 58a,58b, 59a, 59b, 60a, 60b, 68, which regulates delivery of hydraulic fluid from a pump 67 to each of the pistons 43a, 43b,48a, 48b, 49a, 49b,50.

The drive system 46 comprises a plurality of rotational speed sensors 52a, 52b, 53a,53b, 54a, 54b, 55 for sensing the difference in rotational speeds across each clutch. Said sensors 52a, 52b, 53a, 53b, 54a, 54b, 55 are operatively connected to said control unit 47. One of said sensors is arranged at each wheel for sensing the speed of rotation of the associated wheel. According to the shown embodiment, the wheel speed sensor senses the movement of a gear tooth in a final transmission at the associated wheel (see also FIG. 2). The speed sensor may be a magnetic pick-up device sensitive to the movement of the gear tooth, which is proportional to the wheel speed. Further, one sensor 55 is arranged to sense the rotational speed of an output shaft of the main gear box 14. The control unit 47 receives signals from the speed sensors 52a, 52b,53a, 53b,54a, 54b, 55 and is adapted to calculate the difference in rotational speeds across each clutch.

Further, the drive system comprises a sensor 56 for sensing the angular relationship between the front frame 3 and the rear frame 7 in the articulation joint 11. Also this angular position sensor is operatively connected to said control unit 47. Said sensor 56 may be an angular position sensor or, alternatively be formed by linear sensors, sensing the extent of projection of the steering hydraulic cylinders (not shown).

The drive system 46 further comprises operator manoeuvrable means 57, in the form of buttons and/or levers, which is operationally connected to the control unit 47 for operator selection of drive of specific combinations of drive wheels.

Thus, the drive system 46 may in certain situations automatically select which wheels should be in driving connection with the engine and which wheels should not. The drive system 46 further gives the driver a maximum freedom in selecting which wheels should be in driving connection with the engine and which wheels should not. For example, when the vehicle is driven uphills, an all-wheel drive may be most advantageous. When the vehicle is driven in a turn, the outer wheels could be controlled to be in driving connection with the engine while the inner wheels may rotate freely along the ground. While driving a longer stretch (transport driving), the driver may select front-wheel drive only.

Further, a traditional main gear box comprises a clutch for the first gear. Thanks to the described drive system, this first gear clutch may be eliminated. The vehicle may instead be started by engaging said pairs of clutches at the transverse drive shafts (the longitudinal drive shafts will in such case rotate while the engine is idling).

The drive system 46 further comprises a converter 72 arranged in driving connection between the engine 14 and the gear box 15. Sensors 73,74 are arranged for sensing the difference in rotational speeds on an input shaft and an output shaft of the converter 72. This rotational speed information is sent to the controller 47 and is used for determining an engine torque. Further, a position of an operator gear selector 71 is also sent to the controller 47.

Figure 5:
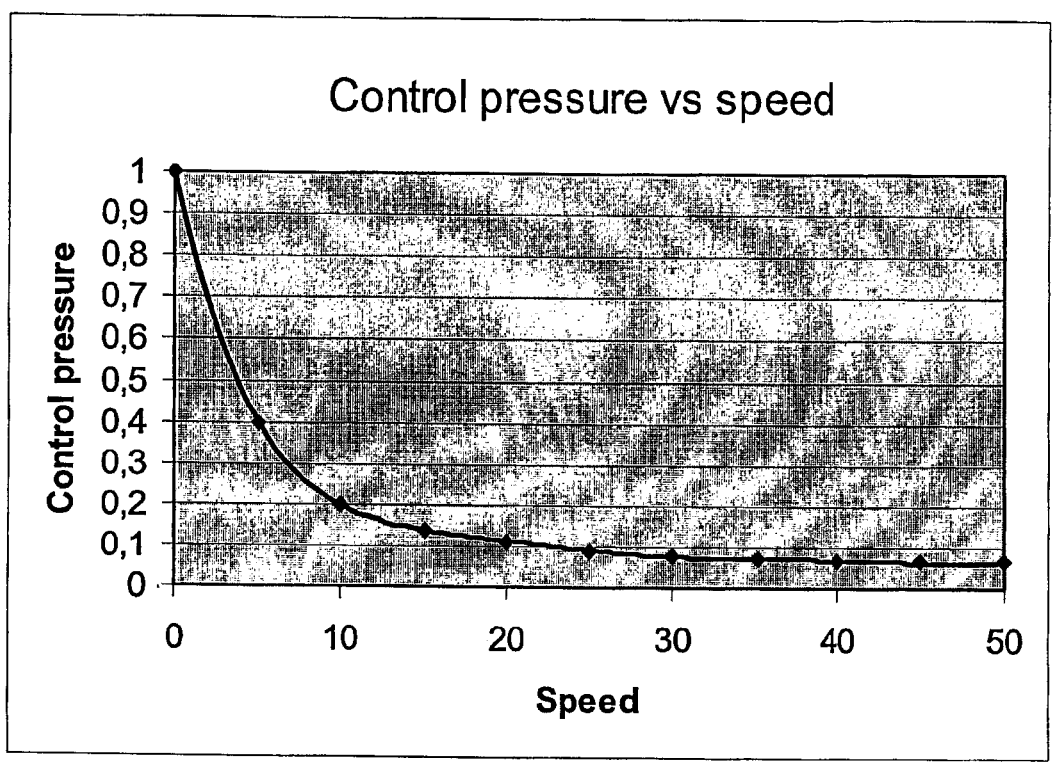
FIG. 5 shows a curve of the clutch control pressure versus vehicle speed.

The controller 47 may be programmed for using the converter rotational speed information and the gear selector information as input data for controlling the clutches. This information may be used for increasing driver comfort. For detected low engine torque, a lower clutch connection pressure may be used for constant slip time. (Using a constant high clutch connection pressure would lead to a jerk when the engine torque is low.) As an example, about ¼ of the clutch connection pressure of the first gear is used for the fourth gear. FIG. 5 shows one example of the clutch control pressure being dependent on a detected vehicle parameter. The clutch connection pressure, or control pressure, (see abscissa) is in this case dependent on the detected vehicle speed (see ordinate). The clutch connection pressure is higher the lower detected vehicle speed.

A method for controlling the power delivered to a plurality of ground engaging members of a vehicle driveline would thus comprise the steps of sensing a rotational speed of each of the ground engaging members and a rotational speed of a rotational member driven by a source of motive power and controlling a plurality of individually selectively engagable clutches arranged between each of said ground engaging members and said rotational member depending on said sensed rotational speeds for engaging and disengaging, respectively, one ground engaging member associated to each clutch to a driving connection with the source of motive power.

Figure 6:
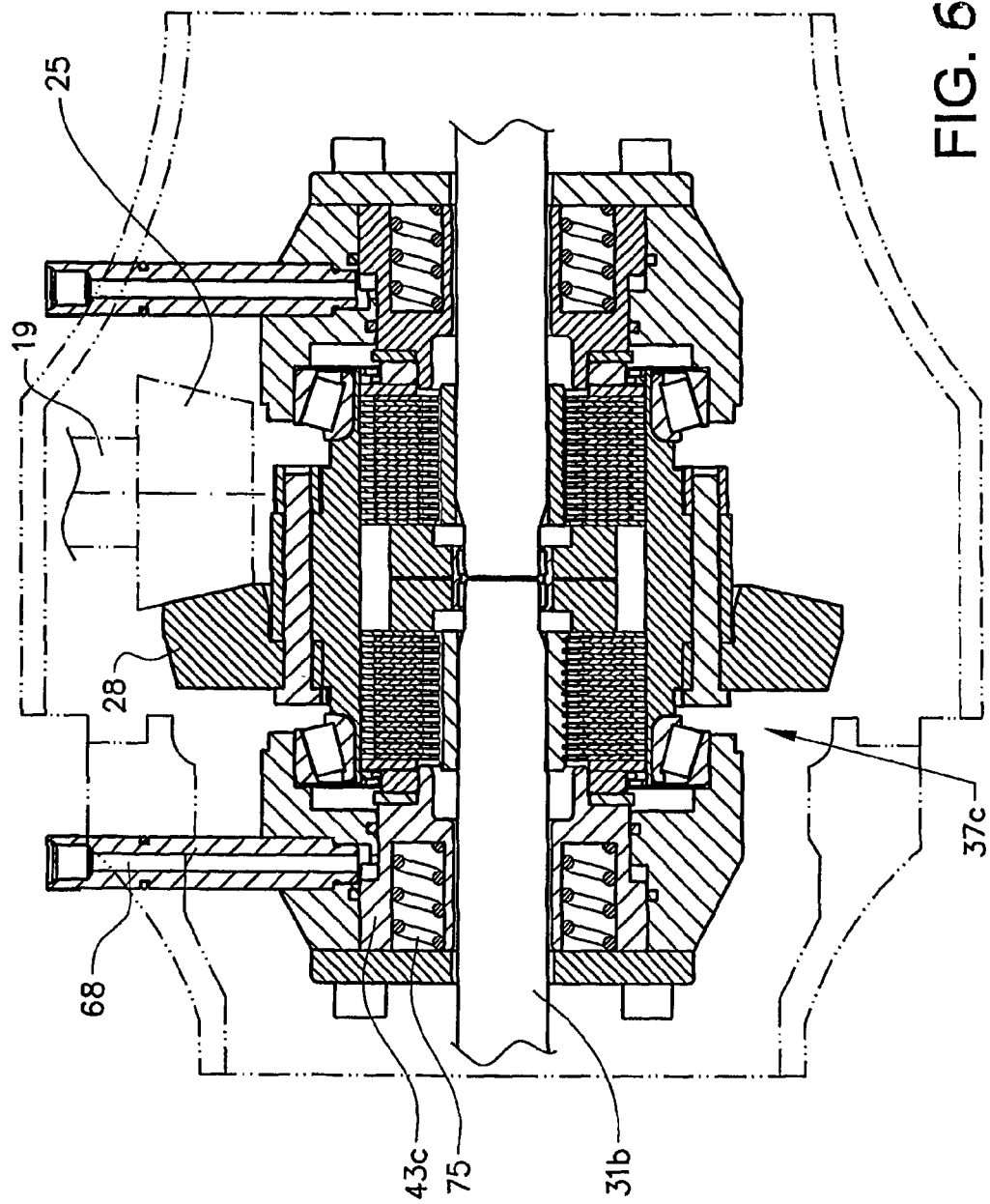
FIG. 6 illustrates an alternative embodiment of the clutch arrangement in FIG. 3.

FIG. 6 shows an alternative embodiment of the clutch arrangement in FIG. 3. Only the different parts in the two embodiments will be described below. The application of the clutch 37c is reversed in relation to the embodiment of FIG. 3. The clutch 37c is engaged by-means of spring force from a spring element 74, in the form of a coil spring. The spring element 75 urges the piston 43c towards the friction disc pack, ie to the right in FIG. 6. Hydraulic pressure is used for disengaging the clutch. This ensures an enhanced security if hydraulic pressure is lost. For disengagement of the clutch 37c, hydraulic fluid is supplied to the piston 43c via the line 68, urging the piston 43c away from the disc pack, ie to the left in FIG. 6, and at the same time compressing the spring element 75.

The invention is not in any way limited to the above described embodiments, instead a number of alternatives and modifications are possible without departing from the scope of the following claims.

It should be understood that the friction disc clutch design shown in FIG. 3 is only to be regarded as an example and not in any way limiting for the invention. The friction disc clutch should comprise at least one disc and a corresponding disc engaging member. The disc and the disc engaging member should be movable relative to each other in an axial direction for engaging and disengaging, respectively, the clutch. One of said disc and the disc engaging member forms an input member of the clutch and the other forms an output member of the clutch. The output member is rotationally fixed to the associated transverse drive shaft.

Further, a vehicle with a plurality of drive axles may have the above-described clutch arrangement for allowing different speeds of the transverse drive shafts in one axle and have a different arrangement for allowing different speeds of the transverse drive shafts in another drive shaft, for example a differential mechanism.

The invention claimed is:

1. Drive system for a vehicle driveline comprising
   a pair of interconnected first transverse drive shafts extending in opposite directions, each of the first transverse drive shafts supporting a ground engaging member,
   a first arrangement allowing the pair of first transverse drive shafts to rotate at different speeds, wherein the arrangement comprises a pair of individually selectively engagable clutches, one clutch for each associated first transverse drive shaft of the pair of first transverse drive shafts, wherein each of the clutches is configured for engaging and disengaging, respectively, the associated first transverse drive shaft to a driving connection with a source of motive power,
   a main gear box,
   a first drive shaft configured to extend in a vehicle longitudinal direction and which rotatively connects the main gear box and the first pair of transverse drive shafts,
   a pair of second transverse drive shafts extending in opposite directions, each of the second transverse drive shafts supporting a ground engaging member,
   a second arrangement allowing the pair of second transverse drive shafts to rotate at different speeds,
   a second drive shaft configured to extend in a vehicle longitudinal direction and which rotatively connects the main gear box and the second pair of transverse drive shafts,
   a longitudinal clutch arranged for engaging and disengaging, respectively, the second pair of transverse drive shafts from a driving connection with the main gear box,
   a control unit,
   a pair of rotational speed sensors, one rotational speed sensor for each associated one of the pair of first transverse drive shafts, each rotational speed sensor being arranged to send to the control unit information regarding a rotational speed of a ground engaging member associated with the associated one of the pair of first transverse drive shafts, and
   the control unit being arranged to individually and selectively engage and disengage each of the clutches in response to the information.

2. Drive system according to claim 1 wherein the second arrangement comprises a pair of individually selectively engagable clutches, one clutch for each second transverse drive shaft of the pair of second transverse drive shafts, and each of the clutches is configured for engaging and disengaging, respectively, the associated second transverse drive shaft to a driving connection with the source of motive power.

3. Drive system according to claim 1 wherein the drive system comprises
   a pair of third transverse drive shafts, each of the third transverse drive shafts supporting a ground engaging member, and a third arrangement allowing the pair of third transverse drive shafts to rotate at different speeds.

4. Drive system according to claim 3 wherein the drive system comprises
   a third drive shaft configured to extend in a vehicle longitudinal direction and which rotatively connects the main gear box and the pair of third transverse drive shafts.

5. Drive system according to claim 3 wherein the third arrangement comprises a pair of individually selectively engagable clutches, one clutch for each associated third transverse drive shaft, and each of the clutches is configured for engaging and disengaging, respectively, the associated third transverse drive shaft to a driving connection with the source of motive power.

6. Drive system according to claim 1 wherein the drive system comprises a transfer gear box operationally connected between the main gear box and the drive shafts.

7. Drive system according to claim 1 wherein the drive system comprises a control unit operationally connected to each clutch for controlling engagement thereof.

8. Drive system according to claim 7 wherein the drive system comprises a plurality of rotational speed sensors for sensing a difference in rotational speeds across each clutch, and the sensors are operatively connected to the control unit.

9. Drive system according to claim 1 wherein at least one of the first and the second arrangement for allowing different speeds comprises a transmission comprising a pinion wheel adapted to be rotationally fixed to an associated longitudinal drive shaft and a crown wheel intermeshed with the pinion wheel and rotationally fixed to an input member of the clutches.

10. Drive system according to claim 1 wherein at least one clutch is a friction disc clutch.

11. Drive system according to claim 1 wherein at least one clutch comprises an actuator for selectively engaging and disengaging, respectively, the at least one clutch.

12. Drive system according to wherein at least one clutch is hydraulically activated.

13. Drive system according to claim 1 wherein at least one clutch is gradually engagable so that it permits, in an active state, different relative rotational speeds between an input member and an output member of the at least one clutch.

14. A vehicle comprising the drive system according to claim 1.

15. Drive system according to claim 4 wherein the third arrangement comprises a pair of individually selectively engagable clutches, one clutch for each associated third transverse drive shaft, and each of the clutches is configured for engaging and disengaging, respectively, the associated third transverse drive shaft to a driving connection with the source of motive power.

16. A method of operating a drive system for a vehicle driveline, the vehicle driveline comprising
- a pair of interconnected first transverse drive shafts extending in opposite directions, each of the first transverse drive shafts supporting a ground engaging member,
- a first arrangement allowing the pair of first transverse drive shafts to rotate at different speeds, wherein the arrangement comprises a pair of individually selectively engagable clutches, one clutch for each associated first transverse drive shaft of the pair of first transverse drive shafts, wherein each of the clutches is configured for engaging and disengaging, respectively, the associated first transverse drive shaft to a driving connection with a source of motive power,
- a main gear box,
- a first drive shaft configured to extend in a vehicle longitudinal direction and which rotatively connects the main gear box and the first pair of transverse drive shafts,
- a pair of second transverse drive shafts extending in opposite directions, each of the second transverse drive shafts supporting a ground engaging member,
- a second arrangement allowing the pair of second transverse drive shafts to rotate at different speeds,
- a second drive shaft configured to extend in a vehicle longitudinal direction and which rotatively connects the main gear box and the second pair of transverse drive shafts,
- a longitudinal clutch arranged for engaging and disengaging, respectively, the second pair of transverse drive shafts from a driving connection with the main gear box,
- a control unit, and
- a pair of rotational speed sensors, one rotational speed sensor for each associated one of the pair of first transverse drive shafts, the method comprising sending, via each rotational speed sensor, to the control unit information regarding a rotational speed of a ground engaging member associated with the associated one of the pair of first transverse drive shafts, and individually and selectively engaging and disengaging each of the clutches with the control unit in response to the information.

* * * * *